United States Patent [19]

Schwarzenbek

[11] Patent Number: 4,906,447
[45] Date of Patent: Mar. 6, 1990

[54] SYNTHETIC AMMONIA PROCESS

[76] Inventor: Eugene F. Schwarzenbek, 3230 Seacrest Dr., Lavallette, N.J. 08735

[21] Appl. No.: 155,275

[22] Filed: Feb. 12, 1988

[51] Int. Cl.$^4$ .............................................. C01C 3/00
[52] U.S. Cl. .................................... 423/358; 423/238
[58] Field of Search ............... 423/238, 359, 361, 362, 423/363, 358

[56] References Cited

U.S. PATENT DOCUMENTS

| | | | |
|---|---|---|---|
| 1,319,663 | 10/1919 | Davis et al. | 423/237 |
| 1,366,303 | 1/1921 | Nicolaas | 423/238 |
| 1,550,806 | 8/1925 | Harter | 423/361 |
| 1,611,359 | 12/1926 | Mott | 423/361 |
| 1,631,720 | 6/1927 | Davis et al. | 423/238 |
| 2,500,291 | 3/1950 | Liebel et al. | 423/238 |
| 2,954,272 | 9/1960 | Schaufelberger | 423/238 |
| 4,287,162 | 9/1981 | Scheibel | 423/238 |
| 4,537,760 | 8/1985 | Lavie | 423/359 |

FOREIGN PATENT DOCUMENTS

| | | | |
|---|---|---|---|
| 758646 | 4/1971 | Belgium | 423/359 |
| 48-23270 | 7/1973 | Japan | 423/238 |
| 53-205 | 1/1978 | Japan | 423/238 |
| 452171 | 8/1975 | U.S.S.R. | 423/359 |
| 1115952 | 6/1968 | United Kingdom | 423/359 |
| 1186939 | 4/1970 | United Kingdom | 423/359 |

*Primary Examiner*—John Doll
*Assistant Examiner*—Wayne A. Langel

[57] ABSTRACT

The synthesis of ammonia from hydrogen and nitrogen is carried out in a process scheme in which a liquid material is provided to react with ammonia to form an ammine to either improve the method of recovery of ammonia from a product gas stream or to upset the thermodynamic equilibrium of the $H_2$—$N_2$—$NH_3$ system so that higher first pass conversion of the reactant gas to ammonia can be accomplished. As a result of this invention the horsepower of the synthesis gas compressor, the catalyst inventory, the operating temperature, and the operating pressure, or combinations of these factors, are reduced, having the effect of decreasing equipment and operating costs. In addition, the liquid ammine product is decomposed under conditions that allow the recovery of the ammonia as a liquid product by heat exchange with cooling water. This markedly reduces refrigeration horsepower requirements.

15 Claims, 2 Drawing Sheets

SYNTHETIC AMMONIA PROCESS

BACKGROUND OF THE INVENTION

1. Field of the Invention

This invention pertains to the field of fertilizer science and technology. The invention pertains, in particular, to the synthesis of ammonia by the catalytic reaction of hydrogen and nitrogen.

2. Description of the Prior Art

The synthesis of ammonia is a simple catalytic reaction in which three mols of hydrogen and one mol of nitrogen combine to form two mols of ammonia. The reaction is highly selective in that no byproducts are formed, the only concern being contaminants in the feed which might poison the catalyst, or inerts, such as methane and argon, which have to be purged from the system. Despite its simplicity, the ammonia synthesis reaction is intrinsically limited by thermodynamic equilibrium. The equilibrium studies first carried out by Fritz Haber in the early nineteen hundreds showed that the synthesis reaction required high pressures and low temperatures, but the extent of conversion was limited and considerable recycle of unreacted gas was required. The effects of the many process variables in the synthesis reaction have been studied by many investigators, as summarized for example in "An Investigation on Promoted Iron Catalysts for the Synthesis of Ammonia", Anders Nielsen, The Haldor Topsoe Research Laboratory, 3rd Edition.

The early synthetic ammonia plants were operated at pressures in excess of 500 atmospheres, but these plants were expensive to build and operate. In recent years ammonia plant installations have been in the 100 to 200 atmosphere pressure range. However, when operating at this lower pressure range at, for example, an 896° F. temperature with 10% inerts in the feed, the equilibrium ammonia content is only 10 to 18% in the product compared to 34% at a 500 atmosphere operating pressure. Temperature also has a pronounced effect on the equilibrium ammonia content. For example, at 200 atmospheres pressure with 10% inerts in the feed, the equilibrium ammonia content at 694° F. is 39% and at 925° F. is only 16%. The effect of an increasing temperature to decrease the equilibrium ammonia content is aggravated in the ammonia process by the highly exothermic heat of the synthesis reaction. For example, when producing 10% ammonia in the product gas there is about a 260° F. rise in temperature as the synthesis gas flows from the inlet to the outlet of the catalyst bed. In a typical catalyst bed in an ammonia reactor the inlet temperature is low and the equilibrium ammonia content is high. However, as a result of the exothermic heat of reaction the outlet temperature is high and the equilibrium ammonia content is low, with the result that the conversion of the reactants to ammonia is low. Furthermore, steps must be taken to decrease the gas temperature before feeding the next catalyst bed. This is typically done by heat exchange or quenching with cold synthesis gas. Typical synthesis reactors may have two to four catalyst beds, but the gas exiting the reactor contains only 10 to 15% ammonia.

It is apparent from the above that high recycle of unreacted feed is required in present day commercial designs. One undesirable result of low conversion to ammonia and high recycle is a build up of the inert content of the feed to the reactor. Inerts in the feed decrease the partial pressure of the reactants and, as a result, there is a decrease in the equilibrium ammonia content. Fresh synthesis gas may have only 1 to 1.5% inerts, as argon and unconverted methane, but will build up to 10 to 15% as a result of the low conversion and high recycle rate. At 200 atmospheres and 925° F. an increase in inerts from 1.5 to 15% decreases the equilibrium ammonia content from 19 to 15%.

Catalyst activity is another variable affecting reactor performance. High activity is desirable in that it allows one to decrease operating temperature and thereby increase the thermodynamic equilibrium ammonia content and the extent of conversion to ammonia. The catalytic material utilized in present day ammonia plants is the long established alkalized magnetite catalyst, and an increase in activity has only been obtained by a decrease in its particle size. Utilization of the higher activity of smaller particle size catalyst has introduced process design problems in that the smaller particle size increases catalyst bed pressure drop, which is an important consideration in the overall plant design in that it adversely affects the horsepower required for recycling unconverted synthesis gas. In early fixed bed designs a particle size of 6-10 mm in diameter was preferred, though in some designs a particle size as large as 14-20 mm in diameter was used. Over the years the designers have been using smaller and smaller size catalyst to take advantage of the increased activity. The literature, however, does not report any designer using catalyst below 1.5-3 mm in diameter.

It is thus apparent to those skilled in the art that the process design of ammonia plants is a complex balance of the many process variables involved—pressure, temperature, space velocity, catalyst activity, catalyst particle size, the amount of inerts in the synthesis gas feed, and the method of removal of the exothermic heat of reaction. The kinetics of the synthesis reaction is dependent on space velocity, catalyst activity, temperature, and the degree to which the conversion approaches the thermodynamic equilibrium ammonia content. The latter is dependent on temperature, pressure, and the amount of inerts in the gas. It is readily apparent that there are many interactions in the process variables involved.

As a result of these multiple design parameters many different commercial unit synthesis reactor designs have resulted. These are extensively illustrated and discussed in "Fertilizer Science and Technology, Volume 2, Ammonia, Part III." In the early design of ammonia synthesis reactors vertical flow of synthesis gas through the catalyst beds was practiced. In more recent reactor designs attempts have been made to take advantage of the higher activity of the smaller particle size catalysts. In order to decrease the higher pressure drop inherent in the use of the smaller particle catalyst, flow through a thinner bed of catalyst by radial flow is practiced. The M. W. Kellogg Company has developed flow through a thinner bed of catalyst in a horizontal reactor design.

An optimized process design for a modern commercial fixed bed unit is illustrated by Quartulli and Wagner of The M. W. Kellogg Company in their publication entitled "Why Horizontal NH$_3$ Converters?", Hydrocarbon Processing, page 117, December 1978. This publication shows some of the undesirable characteristics of a typical present day synthetic ammonia process. The horizontal reactor with a capacity of 1712 tons/day of ammonia has three beds of catalyst, the outlets from beds 1 and 2 being cooled by direct quench with cold feed gas. The ammonia content builds up from 1.7% at the inlet of bed 1 to 8.2% at the outlet, to 12% at the outlet of bed 2, and to 13.2% at the outlet of bed 3. The net build up is only 10.1% basis feed. This low conversion has a significant affect on other steps in the ammonia plant process scheme. It is apparent from the low conversion to ammonia that considerable recycle of unconverted feed is required. It can be calculated that the recycle rate is 3.6 times the fresh makeup synthesis gas. The high recycle rate has the effect of increasing the size of the reactor, the horsepower of the synthesis gas compressor, and as well the horsepower requirement of the ammonia refrigeration compressor. The recycle gas stream is combined with the makeup synthesis gas, and the total stream which contains only about 10% ammonia is cooled by ammonia refrigeration from about 100° F. to about $-10°$ F. for the recovery of ammonia. The cooling load is a combination of the cooling and condensation of ammonia and the cooling of substantial quantities of unconverted synthesis gas.

It is apparent from the above that there are a number of areas in an ammonia synthesis plant where investment and operating costs could be minimized. The application of this invention will greatly reduce some of these costs.

SUMMARY OF INVENTION

This invention pertains to a new and novel method of carrying out the synthesis of ammonia from hydrogen and nitrogen in which the ammonia product is reacted with a liquid material to form an ammine product, whereby the method of recovery of ammonia from the product gas is improved. In one embodiment of this invention two or more fixed beds of catalyst are used in the synthesis step. The ammonia product from each bed is removed by reaction in a separate vessel to form a liquid ammine product before the unconverted portion of the gas is fed to the next catalyst bed. As a result high conversion of the reactant gas to ammonia can be accomplished is each bed as the gas flows from bed to bed without the necessity of cooling, recompressing, and the recycle of large volumes of unreacted synthesis gas.

In another embodiment of this invention, the synthesis of ammonia is carried out in the presence of the synthesis catalyst suspended in a liquid material that reacts with the ammonia as produced to form a liquid ammine. As a result the thermodynamic equilibrium of the $H_2-N_2-NH_3$ system is upset and once through conversion of the reactants in excess of 90% can be accomplished without recycling unconverted synthesis gas.

Another embodiment of this invention provides for the decomposition of the liquid ammine product under conditions which allows the recovery of the ammonia as a liquid by heat exchange with cooling water.

As a result of this invention the horsepower requirement of the synthesis gas compressor and the ammonia refrigeration compressor, the catalyst inventory, the operating temperature, the operating pressure, or combinations of these factors are reduced, having the effect of decreasing equipment and operating costs.

DESCRIPTION OF INVENTION

Figure 1:
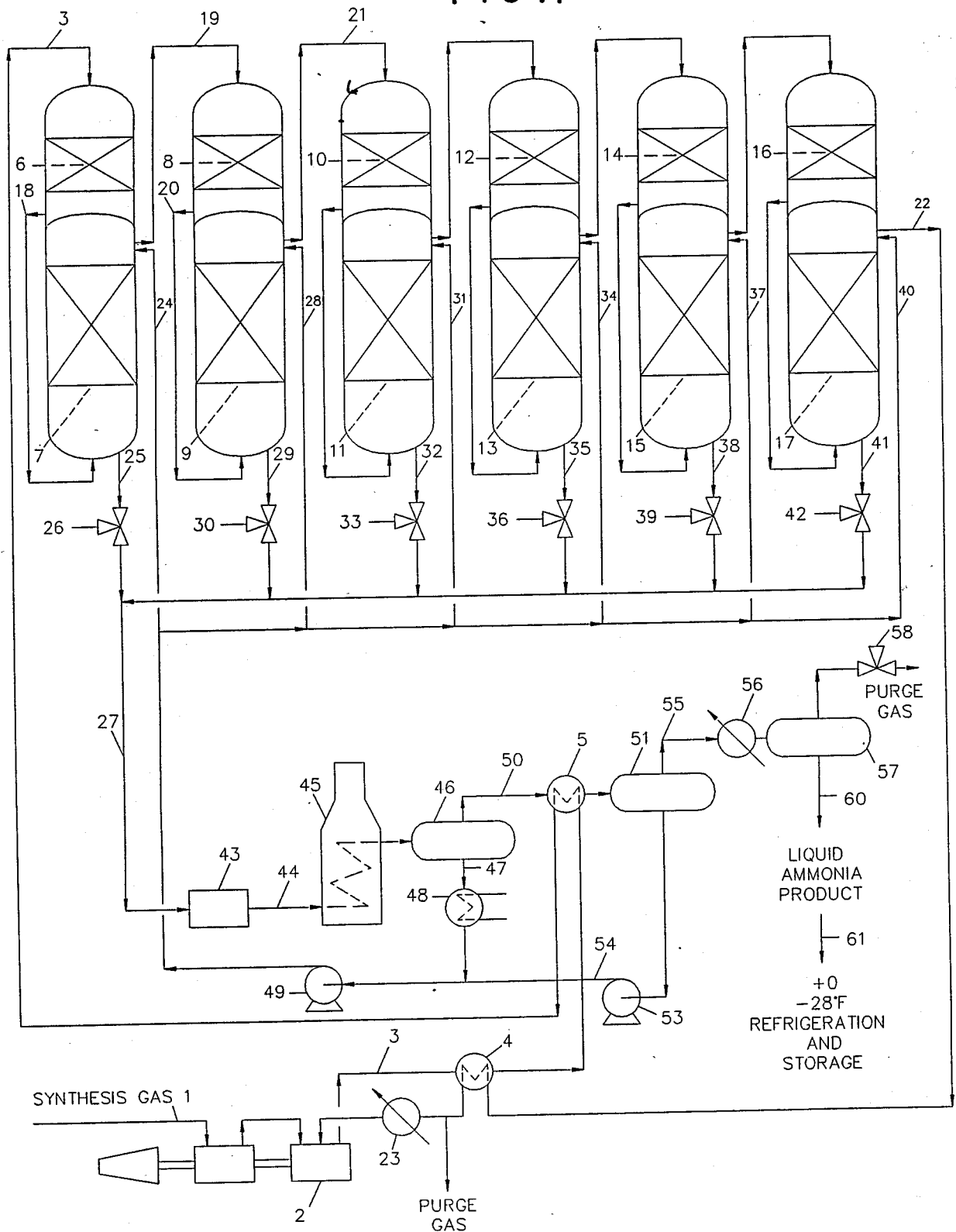
FIG. 1 is a schematic diagram, not to scale, of a simplified ammonia synthesis and ammonia recovery flow chart illustrating one embodiment of this invention. In this system there are six fixed beds of catalyst, the product gas from each bed being fed to its respective absorber where the ammonia produced is removed by reaction with a liquid material to form a liquid ammine before the unconverted gas is fed to the next catalyst bed. The liquid ammine product from each absorber is decomposed in a common separate step to recover the ammonia as a liquid by heat exchange with cooling water, the decomposed liquid material being recycled as fresh reactant to the absorbers.

It is apparent from the prior art that present day synthetic ammonia installations are characterized by low conversion of the hydrogen and nitrogen reactants to ammonia-the ammonia contents of the product gas from the reaction vessel being only 10 to 15%. This is a result of the combined effects of the thermodynamic equilibrium limitations and the problem of removal of the exothermic heat of reaction. Operating pressures and recycle gas rates are high with the result that the synthesis gas compressor horsepower requirement is high. Also the recovery of ammonia from the dilute gas stream requires considerable ammonia refrigeration horsepower. The practice of this invention materially reduces these high horsepower requirements.

Liquid materials that react with ammonia to produce ammines are used in the practice of this invention. Certain inorganic salts react with ammonia to form adducts which are referred to as ammines. This formation of ammonia adducts is similar to the formation of inorganic salt hydrates. Most salts form more than one adduct. Cuprous chloride, for example, forms 0.5, 1.5, and 3 mols of ammonia adducts per mol of salt. Lithium bromide forms 1, 2, 3, 4, 5, and 6.5 mols of ammonia adducts per mol of salt. The inorganic ammines are similar to inorganic hydrates in that their melting points are much lower than those of their respective inorganic salt. Cuprous chloride has a melting point of 792° F., whereas the corresponding ammines have melting points of 253° to 324° F. Likewise, lithium bromide has a melting point of 1017° F., whereas the corresponding mono-ammine has a melting point of only 207° F. Most inorganic ammines are solid at room temperature, but at the temperature levels of the ammonia synthesis process are liquid. Advantage is taken of the reaction of certain inorganic salts with ammonia and the low melting points of the resulting ammines in the development of this invention.

My invention pertains to the providing of a liquid material which reacts with ammonia to produce an ammine, which later is decomposed back to a liquid reacting material for recovery of the ammonia product. The requirement of this reacting material is that it have low decomposition or equilibrium pressure at the 650° to 925° F. operating range of the present day ammonia synthesis alkalized magnetite catalyst, and have a higher decomposition pressure at some reasonable higher temperature which would allow the ammonia to be recovered by heat exchange with cooling water. The preferred embodiment of my invention is that the reacting material at all times be a liquid, since this provides for ready flow of the reacting material between the synthesis and decomposition sections of the process, and also provides readily for heat removal in the ammonia synthesis section and heat input in the decomposition section.

In view of the low melting point of the inorganic ammines, an attractive operating system would involve the reaction of ammonia with the liquid monoammine to form a di-ammine, and flow of the di-ammine to the decomposition section to produce ammonia and the mono-ammine for recycling to the synthesis section. In this system the operating conditions are such that at all times the decomposition equilibrium pressure is above that of the mono-ammine. This prevents the production of a solid high melting point inorganic compound. This, however, does not preclude the consideration of using, for example, a high melting point salt as a reactant with ammonia to produce a mono-ammine which would later be decomposed back to the ammonia free inorganic salt. In this case a low melting point material, for example sodium amide, would be used as a solvent for the high melting point salt to maintain the system in a liquid condition at all times. Many of the inorganic ammines have decomposition or equilibrium pressures too high to be attractive in the ammonia synthesis process. However, this property of the ammines can be modified by chelation with, for example, ethylene diamine. Therefore, in addition to an inorganic salt and an inorganic ammine, the reactant material in my invention could be an organic-inorganic salt or an organic-inorganic ammine.

Many different inorganic salts react with ammonia to form ammines. They may include chlorides, bromides, iodides, nitrates, sulfates and other compounds. The metal components may include zinc, cadium, copper, nickel, magnesium, barium, iron, manganese, lithium, sodium, potassium, calcium, aluminum, titanium, and others. These ammines vary considerably in their stability. For example, the di-ammine of lithium bromide has an ammonia decomposition or equilibirium pressure of 1 atmosphere at 190° F., the di-ammine of calcium chloride at 329° F., and the di-ammine of zinc bromide at 712° F. The advantageous application of a particular ammine will depend on the operating temperature and pressure of the system. There are a number of inorganic ammines which have application in the present day synthetic ammonia process. They include, for example, the mono- amd di-ammines of the bromides of nickel, iron, cobalt, magnesium, and zinc, and the chlorides of cobalt and zinc. This invention, however, is not restrictive to the use of these particular materials.

In this invention the following reaction is used to illustrate the use of the inorganic ammines in a synthetic ammonia process.

$$ZnBr_2 \cdot NH_3 + NH_3 \rightleftharpoons ZnBr_2 \cdot 2NH_3$$

The relationship of decomposition or equilibrium pressure with temperature for the zinc bromide di-ammine is as follows:

$$\ln P = -1.6068 \frac{10^4}{T} + 13.713$$

where
P + Ammonia pressure in atmospheres
T + Temperature °Rankine
The above reaction proceeds in the forward or reverse direction depending on the temperature and pressure of the system. Although the zinc bromide mono- and di-ammine system is used to illustrate the examples below, any liquid ammine with the equilibrium or decomposition pressure and temperature relationship similar to that indicated above will perform in a similar manner.

EXAMPLE 1

In this example, illustrated in FIG. 1, the catalyst in a 3000 psia unit is divided into six equal compartments, though more or less compartments can be used, and more or less catalyst can be used in one compartment compared to another compartment. The exit gas from each catalyst bed is fed to an absorber where essentially all the ammonia is removed from the gas before feeding to the next catalyst bed. This procedure is followed for all catalyst beds with the result that the first pass conversion through the reaction system is much higher than in a conventional fixed bed unit. The amount of unconverted recycle gas is markedly reduced. The temperature of the outlet gas from each absorber is set at about 655° F. by the decomposed liquid ammine feed, at which temperature the equilibrium or decomposition pressure of ammonia is only 0.5 atmospheres. At a 3000 psia operating pressure this is equivalent to an ammonia content of only 0.24% in the feed gas to the subsequent catalyst beds. The ammonia contents of the exit gas from each catalyst bed is 11.2-12 mol%, the removal of the ammonia produced in each bed resulting in a high conversion of the reactant gas as it flows through the six beds. The decomposed liquid ammine is fed at a rate sufficient to react with the ammonia produced and as well to absorb the exothermic heat of the synthesis reaction and the exothermic heat of the ammonia with the liquid reactant material without obtaining excessively high temperatures in the absorber. The exit temperature of the liquid from the bottom of the absorbers is in the range of 950° to 975° F. Higher or lower inlet and outlet temperatures can be used depending on the particular reactant material used, the activity of the synthesis catalyst, and the amount of ammonia in the product gas from each catalyst bed.

One significant advantage of the liquid ammine system is that the ammonia can be recovered as a liquid by heat exchange with cooling water. Liquid ammonia has a vapor pressure of 212 psia at 100° F. In this particular example the ammonia product is recovered by decomposing the liquid ammine at a temperature of 1014° F. and a pressure of about 242 psia.

These processing steps are illustrated in detail in FIG. 1. The synthesis gas feed 1 produced, for example, in a reformer-purification section [not shown] is joined with unconverted recycle gas 22 and increased to reaction pressure by compressor 2. The total feed 3 is increased to reaction temperature by flow through heat exchangers 4 and 5, and fed to the reaction system. The reaction system contains six catalyst beds, 6,8,10,12,14, and 16, and six absorbers 7,9,11,13,15, and 17. The total feed 3 flows downward through the first fixed catalyst bed 6. The product gas 18 from catalyst bed 6 flows to the bottom of absorber 7 where the product ammonia is reacted with the liquid reactant material 24. The exit gas 19 from absorber 7 flows directly to the top of catalyst bed 8. The exit gas 20 from catalyst bed 8 flows to the bottom of absorber 9. The exit gas 21 from the top of absorber 9 flows directly to the top of catalyst bed 10. The synthesis gas thus flows progressively through catalyst bed 10 and absorber 11, catalyst bed 12 and absorber 13, catalyst bed 14 and absorber 15, and finally through catalyst bed 16 and absorber 17. The exit or recycle gas 22 from absorber 17 is cooled via heat exchanger 4 and water cooler 23, joins synthesis makeup gas 1, is compressed, and flows to the first catalyst bed 6 and absorber 7.

The liquid reactant material 24 to absorber 7 flows countercurrent to the exit gas 18 from catalyst bed 6, and exits as the ammonia rich liquid ammine in line 25, through pressure control valve 26 to line 27 which feeds the ammine rich product from the various absorbers to the ammonia recovery system. Similarly liquid reactant material feed 28 to absorber 9 exits from the absorber in line 29 through pressure control valve 30 to join line 27. Similarly liquid reactant material 31,34,37, and 40 feed absorbers 11,13,15, and 17 respectively, exit through lines 32,35,38, and 41 respectively, through control valves 33,36,39, and 42 respectively to feed recovery line 27. The ammonia rich liquid ammine flows through hydraulic turbine 43 for recovery of power from the pressure release from the synthesis section to the ammonia recovery section. The liquid ammine 44 flows through furnace 45 to separator 46 where the ammonia depleted liquid reactant material 47 is withdrawn through heat exchanger 48 to pump 49. Liquid reactant material from pump 49 is fed in lines 24,28,31,34,37, and 40 to their respective absorbers. Ammonia gas 50 is partially cooled in exchanger 5, and then flows to separator 51 where condensed liquid ammine is withdrawn through line 52 to pump 53 and returned via line 54 to the inlet of pump 49. Partially cooled ammonia is water cooled in exchanger 56 and flows to separator 57. Pressure in separator 57 is controlled by valve 58 to maintain the ammonia as a liquid. Entrained gases are exited through line 59. Liquid ammonia 60 is withdrawn from separator 57 and flows through line 61 to an ammonia refrigeration system [not shown] for cooling and storage of the product at about −28° F. if so desired. The advantage of the liquid ammine system over conventional fixed bed operation is illustrated in Table 1.

TABLE 1

| Unit | MWK Horizontal Reactor | This Invention Example 1 |
|---|---|---|
| Capacity | 1712 T/day | |
| Pressure | 3000 psia | |
| Catalyst - CF | 1947 | 990 |
| Feed Conversion | | |
| Per pass | 23.9 | 78.8 |
| Ultimate | 93.9 | 94.6 |
| Mols per hour | | |
| Synthesis gas | 18135 | 18003 |
| Recycle gas | 64910 | 4343 |
| Total feed | 83045 | 22346 |
| NH3 Product | | 8380 |
| Compressor Horsepower | | |
| Synthesis gas | 28573 | 28365 |
| Recycle gas | 3587 | 220 |
| Refrigeration | 16737 | 3905 |
| Ammine pump | — | 1897 |
| Total | 48897 | 34387 |

In this illustration pressure was maintained at 3000 psia for both the conventional M. W. Kellogg fixed bed unit and the fixed bed ammine system unit of this invention. Catalyst requirement for the liquid ammine system was only 990 cubic feet compared to 1947 cubic feet for the conventional fixed bed unit. The first pass conversion for the liquid ammine system was 78.8% compared to only 23.9% for the conventional fixed bed system. This had the effect of markedly reducing the recycle of unconverted synthesis gas from 64,910 mols per hour to only 4,343 mols per hour, and as a result the recycle compressor horsepower was decreased from 3587 to 220. Since the ammonia was recovered as a liquid in the liquid inorganic ammine system by heat exchange with cooling water, the ammonia refrigeration horsepower was decreased from 16,737 to only 3905. Total gas compression and pump horsepower was decreased from 48,900 for a conventional fixed bed unit to 34,400 for this invention.

EXAMPLE 2

In another embodiment of this invention the catalyst for the synthesis of ammonia from hydrogen and nitrogen is suspended in the liquid reactant material. As illustrated in the schematic drawing FIG. 2 of this invention, synthesis gas 2 in the ratio of 3 parts of hydrogen to 1 part of nitrogen is fed to the bottom of reaction vessel 1. Ammonia produced from the catalytic reaction is reacted with the liquid reactant material. In this particular example the pressure is 1000 psia and the optimum temperature is 750° F. The equilibrium or decomposition pressure of the liquid di-ammine formed from the reaction is 1.58 atmospheres of ammonia pressure, or 23.3 psia equivalent to 2.3 mol% of ammonia in the vapor phase at the 1000 psia operating pressure. As the reaction proceeds the ammonia product continuously reacts with the liquid reactant material, and the ammonia content never exceeds the 2.3% in the vapor phase. The equilibrium ammonia content at the inlet of the reactor under these operating conditions is 19.5 mol%. This equilibrium ammonia content changes only slightly due to a buildup of inerts as the gas flows from the bottom to the top of the reaction vessel. Since the ammonia content in the vapor phase is at all times low, there is a large driving force for the synthesis reaction to proceed. The liquid ammine produced from the reaction with ammonia is withdrawn from the top of the reactor. A portion is cooled and returned to the bottom of the reaction vessel to aid in removing the exothermic heat of the synthesis reaction and the reaction of the ammonia with the liquid reactant material. The balance of the liquid ammine withdrawn is fed to the ammonia recovery system.

A further advantage of this invention is that it is possible to recover the ammonia product as a liquid by heat exchange with cooling water. If the ammonia product collected at about 100° F. can be used directly for further processing to produce, for example, urea, the expensive ammonia refrigeration system of conventional ammonia plants can be completely eliminated. If ammonia product is cooled to −28° F. for storage, the ammonia refrigeration requirement is only to cool the liquid from 100° F. to −28° F. In conventional ammonia processing additional ammonia refrigeration is required to condense the ammonia and to cool the large volumes of unreacted recycle gas to about −10° F. In this invention the refrigeration horsepower load is only 23% of that in a conventional present day plant.

Figure 2:
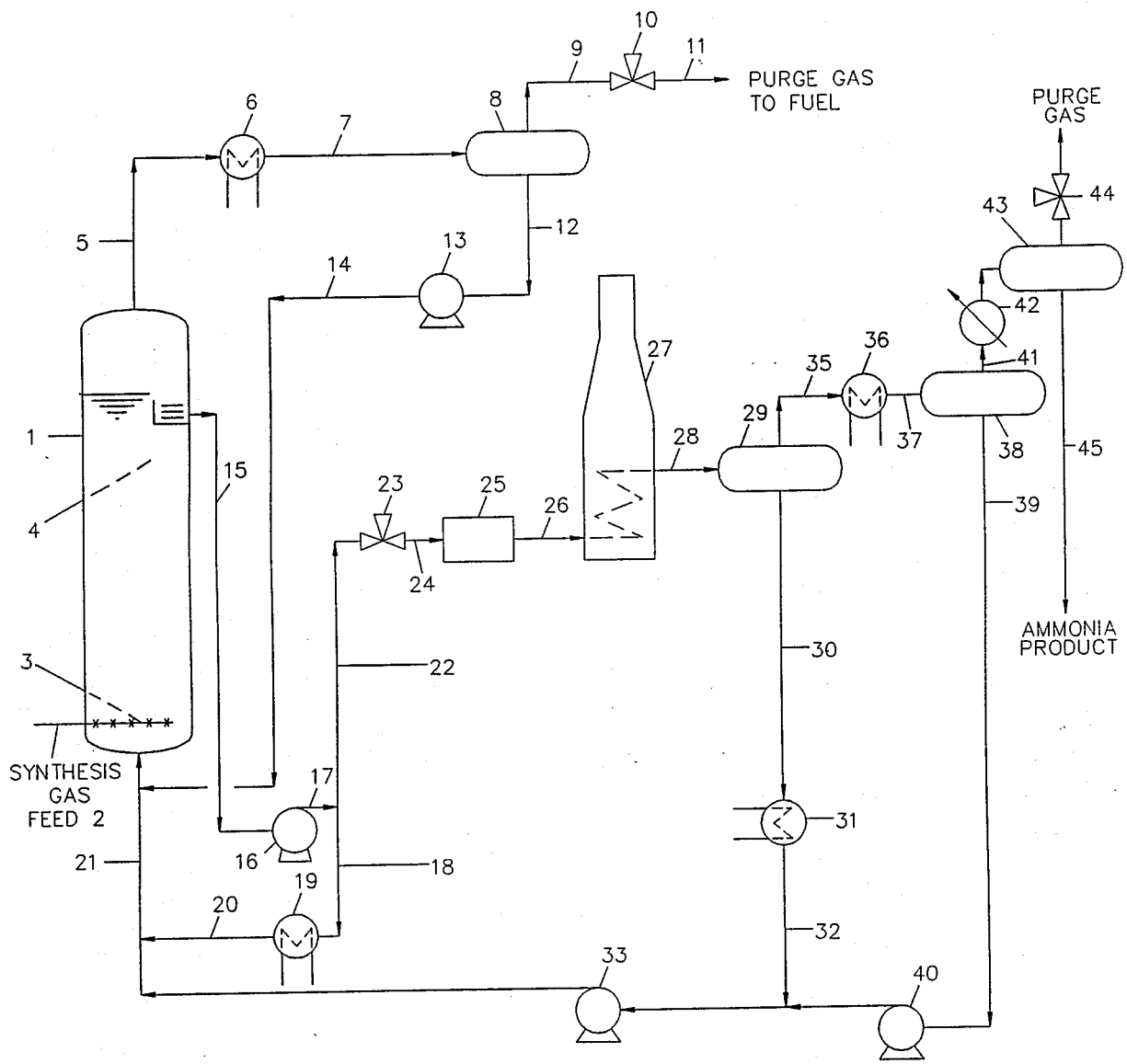
FIG. 2 is another embodiment of this invention in which the synthesis catalyst is suspended in a liquid material which reacts with the ammonia as produced to upset the thermodynamic equilibrium and allow conversion of the reactant gas in excess of 90%. The liquid ammine is decomposed in a manner similar to that presented in FIG. 1.

FIG. 2 is a schematic diagram, not to scale, of a simplified ammonia synthesis flow chart illustrating this embodiment of the present invention. The reaction vessel 1 is provided with an inlet conduit 2 for introduction of the synthesis gas feed comprising the hydrogen and nitrogen reactants for the ammonia synthesis. A feed gas distributor 3 is provided near the bottom portion of the vessel 1 to facilitate distribution of the feed gas across substantially the entire cross section of the vessel. The feed gas flows upward through the reaction vessel 1 which contains a liquid suspension 4 of synthesis catalyst in a liquid reactant material. The product gas leaves the reaction vessel 1 through conduit 5, is cooled in heat exchanger 6, and flows through conduit 7 to a gas-liquid separator where condensed liquid ammine is separated from the purge gas. Product gas from separator 8 flows through conduit 9 and through a pressure control valve 10 to outlet line 11 where the purge gas flows to fuel. Liquid ammine separated in vessel 8 flows through conduit 12 to pump 13 and returned via conduit 14 to the reaction vessel 1. Liquid ammine in vessel 1 is removed via conduit 15 to pump 16 and pump outlet line 17. A portion of the liquid ammine is recirculated to the reaction vessel 1 via conduit 18, through heat exchanger 19, and through conduits 20 and 21. The other portion of the liquid ammine from pump outlet line 17 is diverted to conduit 22 for ammonia recovery. This liquid flows through pressure control valve 23 to conduit 24, through hydraulic turbine 25 to conduit 26 for heating in furnace 27. The effluent from furnace 27 flows via conduit 28 to liquid-gas separator 29. The decomposed reactant material flows from separator 29 through conduit 30, heat exchanger 31 and conduit 32 to pump 33. The product from pump 33 flows through conduit 34 and joins recycle liquid ammine from conduit 20 in conduit 21 for feed to the bottom of reaction vessel 1. The gaseous effluent from separator 29, consisting essentially of ammonia, flows through conduit 35 through heat exchanger 36, and through conduit 37 to gas-liquid separator 38. Ammine material condensed in heat exchanger 36 and collected in gas-liquid separator 38 is returned via conduit 39 and pump 40 to the inlet of pump 33. The gaseous ammonia product from gas-liquid separator 38 flows through conduit 41 to water cooler 42 where the ammonia product is condensed and collected in gas-liquid separator 43. The pressure in the ammonia condensation step is controlled by valve 44 through which any unreacted gas is vented to fuel. The liquid ammonia collected in gas-liquid separator 43 is withdrawn through conduit 45 and fed to a conventional ammonia refrigeration system [not shown] if product at about −28° F. is desired for storage.

The comparison of pertinent process conditions of Example 2 of this invention and the 3000 psia M. W. Kellogg designed unit with a horizontal fixed bed reactor previously described is presented in Table 2.

TABLE 2

| Unit | MWK Horizontal Reactor | This Invention Example 2 |
| --- | --- | --- |
| Capacity | 1712 T/day | |
| Pressure - psia | 3000 | 1000 |
| Temperature - °F. | 750–920 | 750 |
| Catalyst - CF | 1947 | 1298 |
| Feed Conversion | | |
| Per pass | 23.9 | 94.6 |
| Ultimate | 93.9 | 94.6 |
| Mols per hour | | |
| Synthesis gas | 18135 | 18003 |
| Recycle gas | 64910 | none |
| Total feed | 83045 | 18003 |
| Compressor Horsepower | | |
| Synthesis gas | 32160 | 12810 |
| Refrigeration | 16737 | 3905 |

In the ammonia synthesis reaction catalyst requirement increases markedly as operating pressure is reduced, this being attributable to the lower equilibrium ammonia content at lower pressure levels. In conventional fixed bed ammonia reactors the synthesis gas, as it flows through the catalyst bed, reacts and increases in temperature. At the exit of the catalyst bed the ammonia content is at a high approach level to the equilibrium ammonia content. However, the exit ammonia content is low because the bed outlet tamperature is high and the equilibrium ammonia content is low. In this invention, because of the reaction of the liquid reactant material with the ammonia as produced in this Example 2, the ammonia content is always at a low level relative to the equilibrium ammonia content. The reaction kinetics is this invention is therefore much higher than in a conventional fixed bed system. As illustrated in Table 2, the pressure in this example was decreased from 3000 to 1000 psia and the catalyst requirement was actually less than in a conventional fixed bed system. In addition the synthesis gas feed is converted to the extent of 94.6% on a once through basis, no recycle of unconverted synthesis gas being required. In the conventional fixed bed process the conversion on a once through basis is only 23.9%, considerable recycle of unconverted gas being required to arrive at an ultimate conversion of 93.9%. The improved reaction kinetics of this example of the invention has the effect of decreasing the synthesis gas compressor horsepower from 32,160 for the conventional fixed bed unit to 12,810 for this example of this invention.

As indicated in Example 1, one of the major advantages of this invention is that the ammonia in Example 2 is also recovered as a liquid at about 100° F. by heat exchange with cooling water. Use of the 100° F. liquid product in subsequent processing would result in elimination of the refrigeration compressor. However, if cooling and storage at about −28° F. is required, the refrigeration horsepower is only 3,905 for this invention compared to 16,737 for a conventional fixed bed unit. In the conventional fixed bed unit refrigeration horsepower is required to cool the large amounts of unreacted recycle gas as well as to cool and liquify the gaseous ammonia. In this invention the heavy heat load of liquefaction is carried out with cooling water with the result that the only need for ammonia refrigeration is to cool the liquid ammonia to a low temperature for storage.

Example 2 illustrated that operating pressure was decreased from 3000 to 1000 psia by utilizing only about two thirds the amount of catalyst used in the conventional fixed bed unit. By increasing the catalyst quantity to about the same level as in the 3000 psia conventional fixed bed unit and using zinc bromide as the reactant material, it was possible to decrease the pressure in Example 2 of this invention to about 25 atmospheres or about 368 psia. This resulted in complete elimination of the synthesis gas compressor.

This invention covers an operating pressure range of about 10 to 500 atmospheres and an operating temperature range of about 300° to 1000° F. in the synthesis section. The decomposition of the liquid ammine to obtain the ammonia product is carried out at an operating pressure range of about 1 to 50 atmospheres and an operating temperature range of about 500° to 1500° F.

Examples 1 and 2 illustrated the advantages of this invention utilizing the reaction of the zinc bromide mono-ammine with ammonia to form the di-ammine. These advantages are attributable to the equilibrium or decomposition pressure-temperature relationship of these two materials. Other compounds that are liquid, will react with ammonia, and have similar decomposition pressure-temperature relationship will give similar results.

I claim:

1. The processing of an ammonia containing gas by contacting the gas with an anhydrous liquid material that reacts with ammonia at a pressure of about 10 to 500 atmospheres and a temperature of about 300° to 1000° F. to form an ammine, subsequently decomposing the liquid ammine at a pressure of about 1 to 50 atmospheres and a temperature of about 500° to 1500° F. to recover the anhydrous ammonia product, and recycling the decomposed ammine to the absorption step.

2. Process of claim 1 in which the anhydrous liquid reacting material is an inorganic salt.

3. Process of claim 1 in which the anhydrous liquid reacting material is an inorganic ammine.

4. Process of claim 1 in which the anhydrous liquid reacting material is a metal organic salt.

5. Process of claim 1 in which the anhydrous liquid reacting material is a metal organic ammine.

6. A process for the production of synthetic ammonia from hydrogen and nitrogen in which the synthesis gas flows through a series of catalyst beds, the exit gas from each bed flowing to its respective absorber in which the ammonia is reacted with an anhydrous liquid material at a pressure of about 10 to 500 atmospheres and a temperature of about 300° to 1000° F. to form an ammine, the gas then flowing to the next catalyst bed for further reaction, the liquid ammine from each absorber being decomposed at a pressure of about 1 to 50 atmospheres and a temperature of about 500° to 1500° F. to recover the anhydrous ammonia product, the decomposed liquid ammine being returned to the absorbers, the exit gas from the final absorber being cooled, combined with makeup synthesis gas and recycled to the first catalyst bed.

7. Process of claim 6 in which the anhydrous liquid reacting material is an inorganic salt.

8. Process of claim 6 in which the anhydrous liquid reacting material is an inorganic ammine.

9. Process of claim 6 in which the anhydrous liquid reacting material is a metal organic salt.

10. Process of claim 6 in which the anhydrous liquid reacting material is a metal organic ammine.

11. A process for the production of synthetic ammonia from a synthesis gas containing hydrogen and nitrogen in which the synthesis gas flows through a bed of ammonia synthesis catalyst suspended in an anhydrous liquid material which reacts with the ammonia as produced at a pressure of about 10 to 500 atmospheres and a temperature of about 300° to 1000° F. to form a liquid ammine whereby conversion in excess of 90 percent of the synthesis gas can be accomplished, the liquid ammine being continuously withdrawn, decomposed at a pressure of 1 to 50 atmospheres and a temperature of 500° to 1500° F. to recover anhydrous ammonia product, and recycled to the reaction vessel.

12. Process of claim 11 in which the anhydrous liquid reacting material is an inorganic salt.

13. Process of claim 11 in which the anhydrous liquid reacting material is an inorganic ammine.

14. Process of claim 11 in which the anhydrous liquid reacting material is a metal organic salt.

15. Process of claim 11 in which the anhydrous liquid reacting material is a metal organic ammine.

* * * * *